PULSE GENERATOR EMPLOYING BISTABLE STORAGE ELEMENTS

Filed Dec. 11, 1963 2 Sheets-Sheet 1

INVENTOR.
STANLEY B. DISSON

BY [signature]

ATTORNEY

PULSE GENERATOR EMPLOYING BISTABLE STORAGE ELEMENTS

Filed Dec. 11, 1963 2 Sheets-Sheet 2

INVENTOR.
STANLEY B. DISSON

BY [signature]
ATTORNEY 3,329,830

PULSE GENERATOR EMPLOYING BISTABLE STORAGE ELEMENTS

Stanley B. Disson, Broomall, Pa., assignor to Burroughs Corporation, Detroit, Mich., a corporation of Michigan Filed Dec. 11, 1963, Ser. No. 329,633
12 Claims. (Cl. 307—88)

This invention relates to electronic pulse generators and, more particularly, to electronic frequency-multiplying pulse train generators in which a predetermined number of pulses is generated in response to a single initiating pulse.

In electronic data processing systems, the operation of the associated subassemblies is generally synchronized by means of pulse-controlled timing. In systems which employ pulse-controlled timing, a basic timing sequence is generated by means of a highly stable signal source, such as a crystal-controlled oscillator, and the basic timing pulses derived therefrom are usually referred to as clock pulses.

In systems such as electronic computers and data processors which utilize pulse-controlled timing to synchronize various operations, it is often desirable to be able to selectively insert, extract, or shift information during the time interval between successive clock pulses. For example, in the operation of the data processing systems utilizing data storage units, there is frequently a need to shift a stored item of data relative to a given reference point in time.

Further, in such information-handling systems, it is often desirable to be able to verify the proper operation of certain subsystems, or to generate special timing pulses or other patterns or words for time-sequenced instructions or program control. Thus, it is desirable to be able to economically generate a pulse train to accomplish selective subroutines during the operation of the data-handling system and to facilitate set-up and check-out procedures to insure proper operation of complex electronic systems and the alarms which monitor their operation.

One solution to the problem of generating a train of pulses during the interval between successive clock pulses in a pulse-controlled timing system involves the use of a basic oscillator of sufficiently high frequency to permit counting down the basic oscillator frequency by means of cascaded binary stages so that the desired pulse repetition frequencies may thereby be obtained. This approach is usually impractical due to the added expense inherent in the use of high-frequency bistable components and the increased complexity of the timing pulse source.

Another possible solution to the problem of generating pulses for initiating selective subroutines in pulse-controlled timing systems involves the utilization of a tapped delay line. The output of the basic oscillator is fed into the delay line and output signals are tapped off after the desired time interval. This approach involves additional gating to selectively control the outputs of the delay line taps and also is often undesirable due to the inflexibility of the specially made delay line and the added cost which is inherent in the utilization of such precision components.

Accordingly, the principal objects of the present invention is to provide an improved frequency-multiplying pulse generator suitable for use in pulse-controlled timing networks.

Another object of this invention is to provide a frequency-multiplying pulse generator of simplified design which employs magnetic recirculation storage means and which, in response to a single initiating pulse, generates a predetermined number of output pulses.

Another object of this invention is to provide a simple and reliable closed-loop logical system for generating a plurality of sequential output pulses in response to a single initiating pulse.

Applicant achieves the above-listed objects by employing a plurality of bistable storage elements arranged in a counter configuration in conjunction with logical control gating means for initiating, and delayed feedback gating means for sustaining, a single cycle of operation of the counter. The control gating means triggers, in response to a single initiating pulse, delayed-action driver means. The initial outputs of the driver means advance an information bit originally preset into the first stage to the second stage of the counter and thereafter gated feedback means sustain the operation of the counter during a single cycle by applying to the control gating means signals which in turn are utilized to advance the information through the counter. Thus a plurality of time-spaced output pulses, generated in response to a single initiating pulse, may be tapped off from the output of the driver means.

Other objects, aspects, and features of applicant's invention can best be understood by referring to the following detailed description in conjunction with the drawings in which.

Before proceeding with a detailed description of applicant's frequency-multiplying pulse train generator, it will be helpful to review the notation employed in conjunction with the schematic diagrams. The preferred embodiment of applicant's invention employs as storage means magnetic cores which have rectangular hysteresis loop characteristics. Cores having these properties are capable of being rapidly switched from one of two possible conditions of magnetization to the other by a magnetizing force exerted by associated electrical windings. These cores additionally are capable of remaining in their last assumed magnetic condition after the force which caused the condition has subsided. Information of opposite polarities to be stored in the binary elements is arbitrarily designated in the binary notation as "1" and "0."

Figure 2:
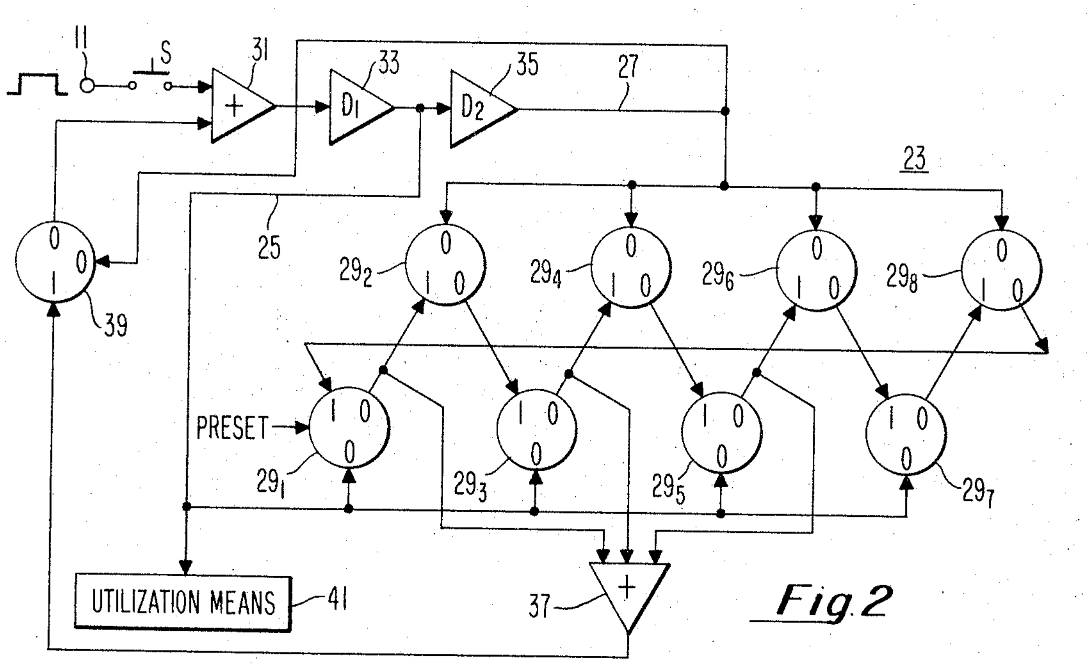
FIG. 2 is a schematic diagram of a pulse generator in accordance with the principles of applicant's invention which utilizes a two-core-per-bit magnetic ring counter.
Figure 4:
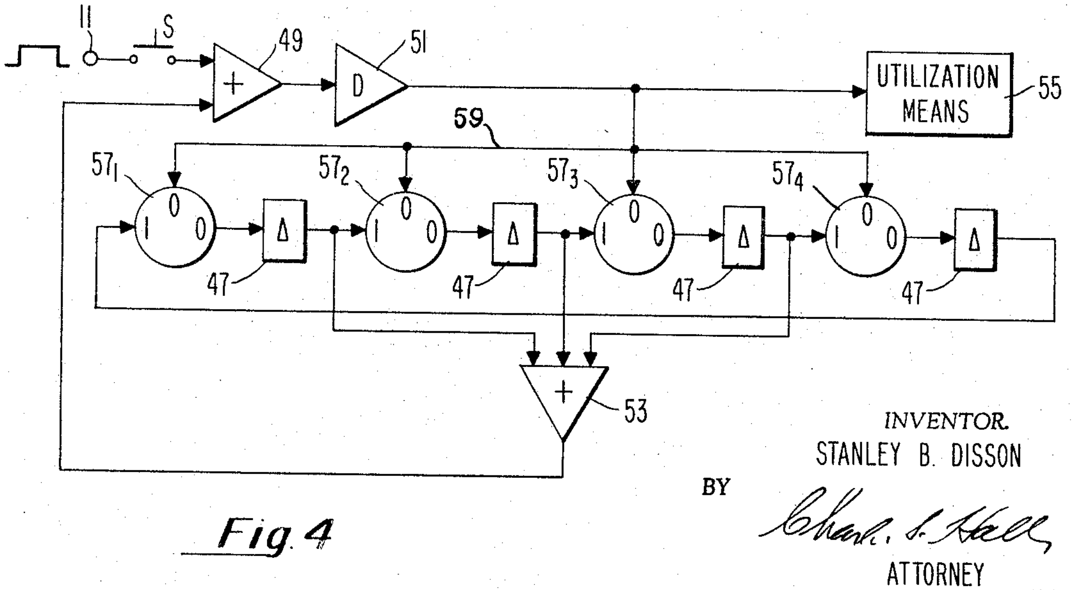
FIG. 4 is a schematic diagram of a pulse generator embodying applicant's invention which utilizes a one-core-per-bit magnetic ring counter.

In the symbolic notation employed in the schematic representations of FIGS. 2 and 4, magnetic cores having essentially rectangular hysteresis loop characteristics are shown as circles. The input windings are shown as an arrow pointing into the bistable magnetic core and touching the circle at its circumference and the output windings are shown as lines without an arrow touching the circumference of the circle. The numbers "1" and "0" at the arrow signify the binary condition into which the core is placed by an input entering the core through the winding represented by such an arrow. A lead touching the circumference of the circle without an arrow indicates that an output signal is produced in the output winding represented thereby when the core has been switched to the binary state shown at the respective lead.

For a further explanation of the operation of magnetic storage devices and the standard logical symbols employed, reference may be had to Chapter 10 of "Digital Applications of Magnetic Devices," John Wiley and Sons, Inc., 1960, of which the applicant was one of the associate editors.

Figure 1:
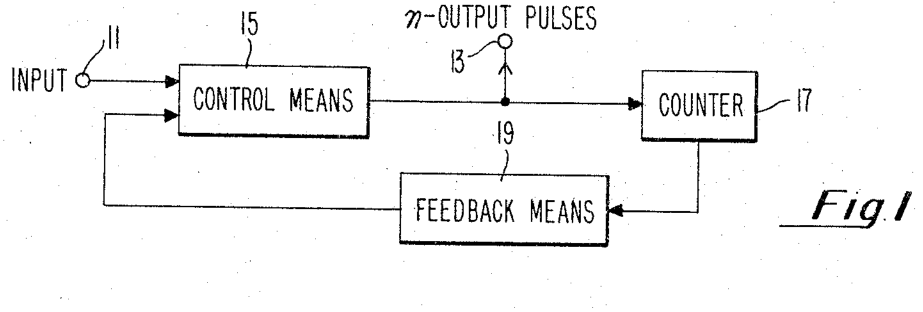
FIG. 1 is a block diagram of a frequency-multiplying pulse generator in accordance with the principle of applicant's invention.

Referring now to FIG. 1, a block diagram of applicant's frequency-multiplying pulse generator is shown in which a single initiating pulse is applied to the input terminal 11 and in response thereto, *n*-output pulses are generated and sequentially appear at the output terminal 13. Applicant's closed-loop frequency-multiplying pulse generator comprises control means 15 for selectively initiating and logically gating the operation of the pulse generator in cooperation with an *n*-stage counter 17 having a single preset information bit which is stepped by pulses emanating from the control means and feedback means 19 for selectively applying signals to the control means to sustain a single cycle of operation of the pulse generator in response to signals tapped from the individual stages of the counter. In order to incorporate an automatic resetting feature into applicant's pulse generator, counter 17 may comprise an *n*-stage ring counter. However, if the automatic resetting feature is not desired, counter 17 may comprise a plurality of cascaded bistable elements arranged in an $n-1$ stage counter configuration in which a single information bit is preset into the first stage. Thus, in either embodiment applicant's frequency-multiplying pulse generator is arranged to generate, in response to a single initiating pulse, *n*-output pulses.

In FIG. 2 and FIG. 4 schematic diagrams of circuits utilizable in the block diagram of FIG. 1 are shown. In FIG. 2 a four-stage magnetic ring counter is shown by way of explanation and should not be construed as limiting the applicability of applicant's pulse generator. The number of stages in the ring counter is determined as a function of the number of pulses to be generated in response to a single initiating pulse. The recirculation register utilized in the closed-loop frequency-multiplying pulse generator, as shown in FIG. 2, comprises a conventional four-stage, two-core-per-bit ring counter 23 in which a preset information bit is arranged to be sequentially advanced therethrough in response to the application of biphase interrogation pulses, alternately applied to advance line 25 which controls a first group of information cores $29_1$, $29_3$, $29_5$, $29_7$, and advance line 27 which controls a second group of the idler cores $29_2$, $29_4$, $29_6$, and $29_8$.

As is well known in the art, it is impractical to read information out of and other information into a magnetic storage element simultaneously because each storage element must be cleared before a subsequent information bit can be read into the storage device. Therefore, a delay must be provided between each successive two storage elements to permit the complete read out of each information bit before the next information bit is shifted into the storage core. It is now common practice to utilize two-core-per-bit magnetic storage in which the register comprises two subregisters wherein alternating storage cores and idler cores are in series. The two subregisters comprising the storage cores and the idler cores respectively are separately controlled by alternately applied advance pulses. Also, it is common practice to utilize reset means, not shown, to reset the contents of the shift register or ring counter to the desired preset condition before a cycle of operation is initiated.

The control means for initiating and logically gating the operation of the ring counter in the embodiment set forth in FIG. 2 comprises a conventional two input OR gate 31 to which the initiating and feedback pulses are consecutively applied and a plurality of cascaded interrogation pulse generating drivers 33 and 35. The OR gate may, by way of example, be the conventional well-known diode gate which produces an output pulse whenever a signal appears at any one of its associated inputs. The output of OR gate 31 directly triggers a first driver 33, having an inherent delay, e.g., a delayed one-shot multivibrator, which is arranged to develop an interrogation pulse to be applied via advance line 25 for controlling the shift operation of an information bit, initially set into core $29_1$ of the first group of magnetic cores. The output of the driver 33 is utilized to trigger a second driver 35 which is similar to the first-described driver and the output of driver 33 is also fed via output terminal 13 to a utilization means 41 hereinafter to be described. The drivers 33 and 35 are well known in the art and, by way of example, may be of the type taught in J. P. Jones Jr.'s Patent No. 2,819,395 of common ownership with the assignee of the present invention.

The feedback means utilized in the embodiment of the closed-loop frequency-multiplying pulse generator set forth in FIG. 2 comprises a three-input OR gate 37, the three inputs being derived from the output windings of the first three cores of the first group of the magnetic ring counter, and a retiming stage 39. The output of OR gate 37 is fed directly to the retiming stage, shown by way of example as a magnetic core. The function of the retiming stage is to reinsert the signal to be fed back to the control means at the proper time to sustain the operation of the ring counter for one cycle.

Figure 3:
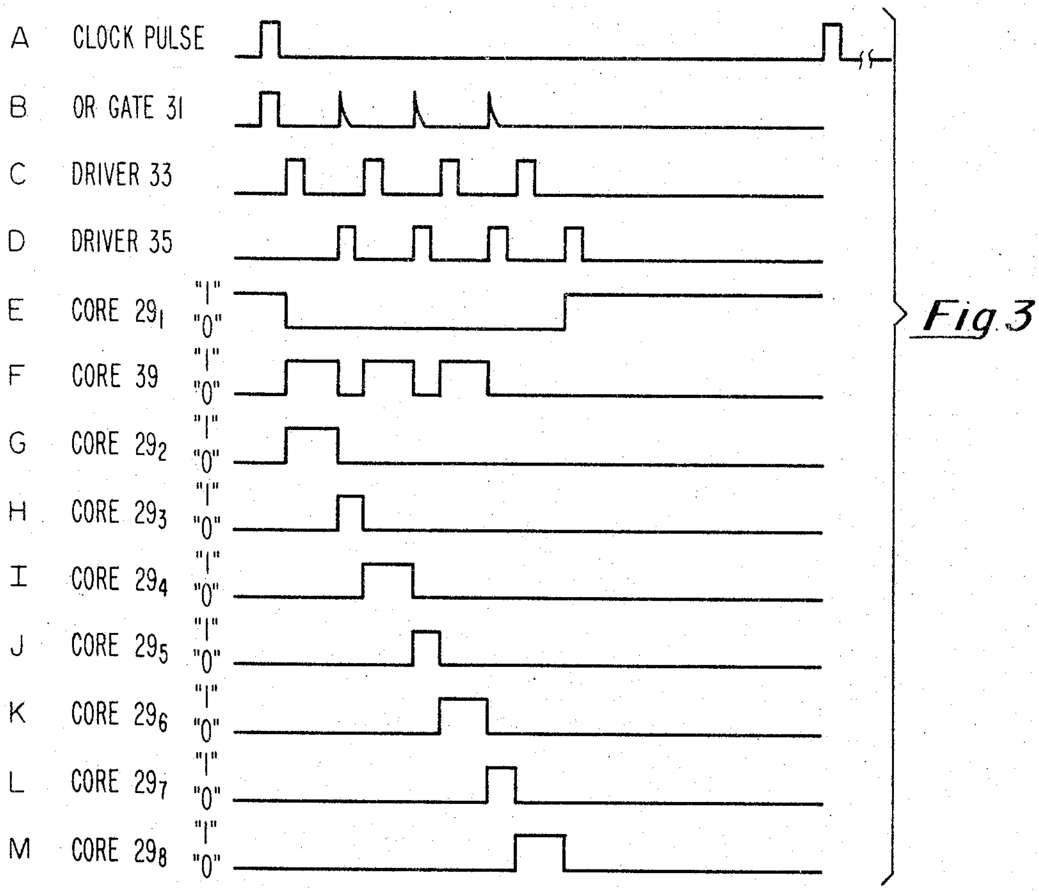
FIG. 3 (A through M) is a diagrammatic representation of the time relationship of idealized waveforms and signal levels occurring at the indicated components during a cycle of operation of the pulse generator schematically shown in FIG. 2.

The operation of the frequency-multiplying pulse generator shown in FIG. 2 may best be understood by referring to FIG. 3 which shows the time relationship of idealized waveforms and signals occurring at the indicated components during a single cycle of operation. In FIG. 3, the clock pulse, initiating the operation of the pulse generator, is shown as FIG. 3A. The output of OR gate 31 directly follows the clock pulse and the output of the first driver is delayed a short interval after the termination of the waveform emanating from OR gate 31.

The first output pulse of the first driver switches the first core $29_1$ of the first group of cores of the ring counter and the flux in the first core switches from a sense indicating a binary "1" to a sense indicating a binary "0." The output signal from core $29_1$ is fed as shown in FIG. 2 via the feedback tap through the OR gate 37 and sets core 39 of the feedback loop to a binary "1." The first output of the first driver is simultaneously applied as the input to the second driver 35 and after the inherent time delay of such a delayed one-shot multivibrator, the first output waveform of the second driver occurs as shown in FIG. 3D.

This first output pulse emanating from the second driver 35 is applied as shown in FIG. 2 via advance line 27 to the second group of cores of the magnetic ring counter and also to core 39 of the delay feedback means. Core 39 is thereby reset to binary "0" state and the generated output waveform is applied as an input signal to the OR gate 31 of the control means. This signal derived from the output winding of the first core of the first group of the magnetic shift register, thus, is applied via OR gate 31 to initiate a second group of output pulses from the cascaded drivers 33 and 35.

The information bit originally preset into core $29_1$ and advanced to core $29_2$ by the first output pulse emanating from the first driver 33 and thereafter advanced to core $29_3$ by the first output pulse emanating from the second driver 35, is now sequentially transferred to core $29_4$ and to core $29_5$ by the second pulses emanating from the first and second drivers, respectively, which were generated in response to the first signal from the feedback means.

In a similar manner, another feedback signal is derived from the output winding associated with core $29_3$ and is fed via OR gate 37 to the delay retiming core 39 and in response thereto, as shown in FIG. 3F, core 39 is again driven to the binary "1" state where it remains until the delay second pulse emanating from the second driver 35 resets core 39 to the "0" state, thereby developing another signal which is applied to the input of OR gate 31 of the control means. As shown in FIG. 3 (E through M) the information bit originally preset into core $29_1$ is sequentially advanced through the ring counter in response to pulses emanating alternately from driver 33 and 35, respectively.

The magnetic ring counter is arranged to automatically reset itself after one cycle of operation. This automatic reset feature is achieved by utilizing cores $29_7$ and $29_8$ by which the originally preset information bit is transferred from core $29_8$ to core $29_1$ in response to the last pulse emanating from the second driver 35. Thus, in response to a single initiating pulse applied to input terminal 11, four output pulses emanating from driver 33 may be tapped off and applied to a utilization means 41 which, by way of example, may be a counter or other logical elements to which a plurality of time-spaced pulses are to be applied. In addition to the four pulses developed at the output terminal 13 in response to a single initiating pulse, another group of output pulses could be tapped off the output of driver 35 and utilized by means similar to the utilization means 41. The two groups of pulses would, as shown in FIG. 3 (C and D), bear a time-displaced relationship.

Referring now to FIG. 4, applicant's frequency-multiplying pulse train generator is shown employing a one-core-per-bit magnetic ring counter. As hereinbefore stated, it is not practical to read information into and out of magnetic storage elements simultaneously, and thus, in the conventional two-core-per-bit magnetic shift register, an information bit is transferred from a first stage, controlled by a first-phase clock pulse into an intermediate or idler stage controlled by a second-phase clock pulse whereby the information is alternately and uninterferingly transferred from storage core to idler core at the respective phases of the control clock pulses. In implementing a one-core-per-bit shift register, delay circuits are inserted between the magnetic storage elements to accomplish the necessary delay to avoid reading information into and out of the magnetic elements simultaneously. The one-core-per-bit register, shown schematically in FIG. 4, may, for example, be of the type taught by J. P. Jones et al. in Patent No. 2,911,626 which is of common ownership with the assignee of the present invention.

As illustrated schematically in FIG. 4, applicant's closed-loop frequency-multiplying pulse train generator comprises a four-stage, one-core-per-bit magnetic ring counter in combination with input control means including two-input OR gate 49 and driver 51, and feedback means schematically shown as three-input OR gate 53. The logical functions of OR gate 49 and OR gate 53 may be combined by utilizing a single four-input OR gate. In that event, the inputs of the four-input OR gate, of the type hereinbefore described, would be connected to the three feedback taps associated with the output windings of cores $57_1$, $57_2$, $57_3$ and the input terminal 11 respectively. Such an arrangement is a matter of logical design.

The logical components and operation of the embodiment of applicant's frequency-multiplying pulse generator schematically shown in FIG. 4 are similar in all respects to those explained in conjunction with the embodiment schematically shown in FIG. 2 with simplifications realized by employing a one-core-per-bit magnetic ring counter. Utilization means 55, similar to those explained in conjunction with the embodiment in FIG. 2, are arranged to receive pulses emanating from driver 51 in response to a single initiating pulse.

The delay means 47 inserted between successive stages of the magnetic ring counter are utilized to delay the output signal emanating from the preceding stage of the ring counter and to introduce such delayed signal via the feedback means at the appropriate time to sustain a single cycle of operation of the magnetic ring counter. Any delay network well known in the art may be employed to achieve the required time delay between successive stages and the delay network, by way of example, may vary from a single resistor-capacitor combination to a single inductor-capacitor pi-section, or even to a composite filter of several such sections. For a further understanding of such delay networks, reference may be had to Chapter 14 of the hereinbefore cited book, "Digital Applications of Magnetic Devices."

Figure 5:
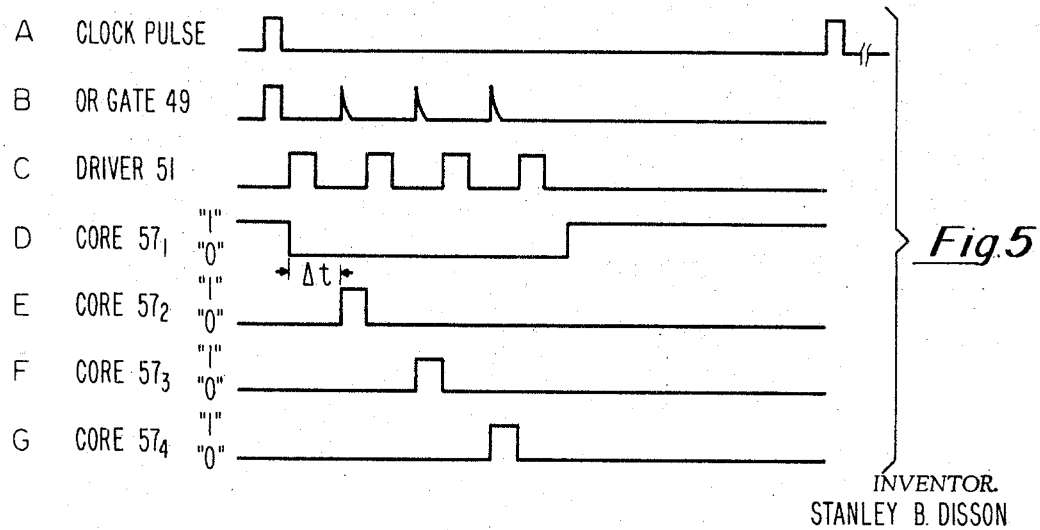
FIG. 5 (A through G) is a diagrammatic representation of the time relationship of idealized waveforms and signal levels occurring at the indicated components during a cycle of operation of the pulse generator schematically shown in FIG. 4.

The operation of applicant's frequency-multiplying pulse generator utilizing a one-core-per-bit magnetic ring counter may best be understood by considering FIG. 4 in conjunction with FIG. 5 which shows in diagrammatic form the time relationship of idealized waveforms and signals appearing at the indicated elements in the closed-loop logical system during a single cycle of its operation. The clock pulse shown in FIG. 5A controls the initial output of OR gate 49 which, in turn, triggers the driver 51. By way of example, driver 51 may be a delayed one-shot oscillator of the type taught by the hereinbefore cited Jones Patent No. 2,819,395 which generates in response to an applied trigger pulse a time-current waveform for controlling the operation of the magnetic storage device.

Referring to FIG. 4 and FIG. 5, a binary "1" is originally preset into core $57_1$ and binary "0's" are originally preset into the other cores of the ring counter by means not shown. This information bit is arranged to be transferred to core $57_2$ in response to the first pulse applied to the advance line 59. As shown in FIG. 5E, the flux of core $57_2$ changes state from that arbitrarily designated as a binary "0" to a binary "1" indicating a transfer of the preset information bit to the second stage after the inherent time delay $\Delta t$ of element 47 which is in series with the transfer loop consisting of the output winding of core $57_1$ and the input winding of core $57_2$. After this time delay, a feedback signal is applied to the input of OR gate 49, thereby initiating another cycle of operation of driver 51.

This second output pulse of driver 51 is applied via advance line 59 to further transfer the information bit from core $57_2$ to $57_3$ after the inherent $\Delta t$ time delay of the delay element 47 in series with the output winding of core $57_2$ and the input winding of core $57_3$. Simultaneous with the transfer of the binary "1" into core $57_3$, a second feedback signal initiates the third cycle of operation of driver 51. Similarly, the delayed output of driver 51 generated in response to the second feedback signal transfers the information bit from core $57_3$ to $57_4$ and a third feedback signal is generated.

Thus, as shown in FIG. 5C, four pulses appear on the advance line 59 in response to a single initiating pulse and the pulses appearing as the output waveforms of driver 51 are applied to suitable utilization means 55. The last pulse emanating from driver 51 is utilized to automatically reset the binary "1" back to the first core $57_1$ of the magnetic ring counter, thereby readying the pulse generator for another cycle of operation.

Applicant's invention has been described in conjunction with a four-stage magnetic ring counter utilizing cores having essentially square loop hysteresis characteristics, but as evident to those skilled in the art, it is equally applicable to other forms of bistable elements which may be arranged in a counter configuration which is not automatically resetting. If it is not necessary for the counter to automatically reset after a single cycle of operation, one stage can be dispensed with and then only $n-1$ stages are required to generate $n$-output pulses. It is applicant's intention, therefore, to be limited only as indicated by the scope of the following claims.

I claim:

1. A circuit for generating a plurality of time-spaced output pulses in response to a single initiating pulse comprising a plurality of cascaded bistable storage elements, gating means for initiating the advancement of a single preset information bit through said storage elements in response to said single pulse, means for generating feedback pulses from selected ones of said storage elements, circuit means responsive to said pulses from said gating means and said feedback means for advancing said preset information bit through said storage elements in a predetermined sequence, and means for combining into a single output pulse train said initiating and feedback pulses.

2. A circuit for generating a plurality of time-spaced output pulses in response to a single initiating pulse comprising a plurality of bistable elements arranged in a counter configuration, driver means for generating pulses to advance a count bit through said counter, feedback means for generating output pulses from selected stages of said counter, and gating means responsive to said single initiating pulse and said feedback pulses for triggering said driver means.

3. The device of claim 2 for generating $n$-output pulses wherein said counter comprises an $n-1$ stage two-core-per-bit magnetic counter and said driving means comprises a plurality of cascaded delayed action single-shot multivibrators.

4. The device of claim 2 for generating n-output pulses wherein said counter comprises an $n-1$ stage one-core-per-bit magnetic counter and said driving means comprises a delayed action one-shot multivibrator.

5. A frequency-multiplying pulse generator for delivering at an output terminal $n$ pulses in response to a single initiating pulse and wherein said pulse generator is automatically reset to its preset condition after a single cycle of operation comprising an $n$-stage ring counter, driver means for generating pulses to cyclically advance a count bit through said ring counter, means for generating feedback pulses from a first group of $n-1$ stages of said ring counter, gating means responsive to said single initiating pulse and said feedback pulses for triggering said driver means, and means interconnecting an output of said driver means and said output terminal.

6. The device of claim 5 wherein said ring counter comprises an $n$-stage two-core-per-bit magnetic ring counter and said driving means includes first and second cascaded delayed-action single-shot multivibrators.

7. The device of claim 5 wherein said ring counter comprises an $n$-stage one-core-per-bit magnetic ring counter and said driving means comprises a delayed-action one-shot multivibrator.

8. A control circuit responsive to a single initiating pulse for cyclically advancing a preset information bit through one cycle of operation of a plurality of cascaded bistable storage elements arranged in a counter configuration comprising driver means for generating pulses to advance said information bit through said bistable storage elements, means for generating feedback pulses from selected ones of said storage elements, and gating means responsive to said initiating pulse and said feedback pulses for triggering said driver means.

9. A frequency-multiplying circuit for generating $n$-output pulses in response to a single initiating pulse and which is automatically reset to a preset condition after a single cycle of operation comprising an $n$-stage two-core-per-bit magnetic ring counter having first and second subregister chains of bistable magnetic cores for storing information in binary form therein wherein a common shift winding having a plurality of turns therein is associated respectively with each subregister, a first group of transfer circuits coupling each core of said first chain respectively with a corresponding core of said second chain, a second group of transfer circuits coupling each core of said second chain respectively with a succeeding core in said first chain, driver means for generating pulses to cyclically advance a count bit through said ring counter by applying advance pulses alternately to said shift windings so as to transfer information successively from one chain of cores to the other chain of cores through said transfer circuits, means for tapping off feedback pulses from selected ones of said first group of transfer circuits, retiming means for delaying said feedback pulses, and gating means responsive to said single initiating pulse and said delayed feedback pulses for triggering said driver means.

10. A frequency-multiplying circuit for generating $n$-output pulses in response to a single initiating pulse and which is automatically reset to a preset condition after a single cycle of operation comprising an $n$-stage one-core-per-bit magnetic ring counter, transfer loop means for coupling adjacent ones of said cores of said counter comprising an output winding, an input winding and delay means interconnecting said output and said input windings, driver means for generating pulses to cyclically advance a count bit through said ring counter, means for tapping off feedback pulses from selected ones of said transfer loop means after said delay means, and gating means responsive to said single initiating pulse and said delayed feedback pulses for triggering said driver means.

11. A frequency multiplying circuit for generating $n$-output pulses in response to a single initiating pulse and which is automatically reset to a preset condition after a single cycle of operation, comprising a plurality of bistable magnetic cores each capable of storing information in binary form, information transfer means coupling the cores into a register chain comprising a transfer loop between each adjacent pair of cores in the chain and inductively coupled thereto, a transfer loop inductively coupled between the last core of the chain and the first core thereof to form the chain into an $n$-stage magnetic ring counter, a common advance line inductively coupled to each core of the chain and when successively pulsed operable through the transfer loops to successively propagate an information bit from core to core around the ring counter, pulse driver means connected to the common advance line and operable to receive an initiating pulse and be triggered thereby to apply a time delayed pulse to the advance line to effect a transfer operation in the ring counter, means for tapping off pulses from selected ones of the transfer loops as the information bit is transferred thereby, and means for feeding such tapped pulses to said driver means for triggering the same into operation to provide a self-sustained cycling of the ring counter whereby a plurality of output pulses is derived from a single initiating pulse received by the driver means.

12. A frequency multiplying circuit for generating $n$-output pulses in response to a single initiating pulse and which is automatically reset to a preset condition after a single cycle of operation, a plurality of bistable elements each capable of storing information in binary form, information transfer means coupling the elements into a register chain including an information bit transfer path connecting each adjacent pair of elements in the chain, a transfer path connecting the last element of the chain with the first element thereof to form the chain into an $n$-stage ring counter, a common advance line connected to each element of the chain and when successively pulsed being operable through the transfer paths to successively propagate an information bit from element to element around the ring counter, pulse driver means connected to the common advance line and operable to receive an initiating pulse and be triggered thereby to apply a time delayed pulse to the advance line to effect a transfer operation in the ring counter, means for tapping off pulses from selected ones of the transfer paths as an information bit is transferred thereby, and means for feeding such tapped pulses to said driver means for triggering the same into operation to provide a self-sustained cycling of the ring counter whereby a plurality of output pulses is derived from a single initiating pulse received by the driver means.

References Cited

UNITED STATES PATENTS

| | | | |
|---|---|---|---|
| 2,760,089 | 8/1956 | Schneider | 307—106 |
| 2,787,416 | 4/1957 | Hansen | 340—174 |
| 2,827,566 | 3/1958 | Lubkin | 307—88.5 |
| 3,054,958 | 9/1962 | Bensky et al. | 307—106 X |
| 3,204,223 | 8/1965 | Crane | 340—174 |

BERNARD KONICK, *Primary Examiner.*

S. M. URYNOWICZ, *Assistant Examiner.*